US012521371B2

(12) United States Patent
Kim et al.

(10) Patent No.: US 12,521,371 B2
(45) Date of Patent: Jan. 13, 2026

(54) MODULATORS OF ALPHA-SYNUCLEIN

(71) Applicant: KAINOS MEDICINE INC., Seongnamsi (KR)

(72) Inventors: Eunhee Kim, Daejeon (KR); Taeik Jang, Cheongjusi (KR); Boksuk Kim, Cheongjusi (KR); Changsun Yu, Yonginsi (KR); Jae Moon Lee, San Diego, CA (US); Sungeun Yoo, Janggunmyeon (KR); Yeontae Chung, Seongnamsi (KR)

(73) Assignee: KAINOS MEDICINE INC., Seongnamsi (KR)

( * ) Notice: Subject to any disclaimer, the term of this patent is extended or adjusted under 35 U.S.C. 154(b) by 574 days.

(21) Appl. No.: 16/622,138

(22) PCT Filed: Jun. 19, 2018

(86) PCT No.: PCT/IB2018/000766
§ 371 (c)(1),
(2) Date: Dec. 12, 2019

(87) PCT Pub. No.: WO2018/234864
PCT Pub. Date: Dec. 27, 2018

(65) Prior Publication Data
US 2020/0206191 A1 Jul. 2, 2020

Related U.S. Application Data

(60) Provisional application No. 62/521,758, filed on Jun. 19, 2017.

(51) Int. Cl.
*A61K 31/415* (2006.01)
*A61P 25/28* (2006.01)
*G01N 33/68* (2006.01)

(52) U.S. Cl.
CPC ............ *A61K 31/415* (2013.01); *A61P 25/28* (2018.01); *G01N 33/6872* (2013.01); *G01N 2800/2835* (2013.01)

(58) Field of Classification Search
None
See application file for complete search history.

(56) References Cited

U.S. PATENT DOCUMENTS

| | | | |
|---|---|---|---|
| 7,939,550 B2 | 5/2011 | Jung et al. | |
| 2005/0176078 A1 | 8/2005 | Allsop et al. | |
| 2010/0063106 A1 | 3/2010 | Jung et al. | |
| 2016/0007893 A1 | 1/2016 | Roberts | |

FOREIGN PATENT DOCUMENTS

| | | | |
|---|---|---|---|
| JP | 2010507653 A | | 3/2010 |
| WO | 2008051047 A1 | | 5/2008 |
| WO | 2010/094090 A2 | | 8/2010 |
| WO | 2012/164136 A1 | | 12/2012 |
| WO | 2016/145046 A1 | | 9/2016 |
| WO | 2019152546 A2 | | 8/2019 |
| WO | 2019152546 A3 | | 4/2020 |

OTHER PUBLICATIONS

McCann et al., α-Synucleinopathy phenotypes. Parkinsonium and Related Disorder, 2014, 20, S62-S67.*
Jeong et al., Subacute toxicity evaluation of KR-33493, FAF1 inhibitor for a new anti-parkinson's disease agent, after oral administration in rats and dogs. Regulatory Toxicology and Pharmacology, 2016, 81, 387-396.*
Office Action for related European Patent Application No. 18820452.3-1112/3641761, dated Feb. 17, 2021, 8 pages.
Jong-Woo et al., "Subacute toxicity evaluation of KR-33493, FAF1 inhibitor for a new anti-parkinson's disease agent, after oral administration in rats and dogs", Regulatory Toxicology and Pharmacology, vol. 81, Nov. 2016, pp. 387-396.
Office Action for related Saudia Arabian Patent Application No. 519410863, 8 pages.
Jankovic, "Parkinson's disease: clinical features and diagnosis", J Neurol Neurosurg Psychiatry, Apr. 2008; 79 (4):368-76. doi: 10.1136/jnnp.2007.131045, pp. 368-376.
Lee et al., "Human α-synuclein-harboring familial Parkinson's disease-linked Ala-53 → The mutation causes neurodegenerative disease with α-synuclein aggregation in transgenic mice", Research Article, PNAS, Jun. 25, 2002, vol. 99, No. 13; https://doi.org/10.1073/pnas.132197599, pp. 8968-8973.
Kasten et al., "The Many Faces of Alpha-Synuclein Mutations", Movement Disorders, Published online May 14, 2013, vol. 28, No. 6, pp. 697-701.
Office Action for related Russian Patent Application No. 2020101482, dated Sep. 28, 2021, 13 pages.
Office Action for related Chinese Patent Application No. 201880040954.1, dated Aug. 19, 2022, 30 pages.
Office Action for related Brazilian Patent Application No. BR112019027029-9, dated Jul. 18, 2022, 8 pages.
International Search Report and Written Opinion issued in Application No. PCT/IB2018/000766 dated Dec. 11, 2018, 9 pages.
Silke Appel-Cresswell, MD, et al., Alpha-Synuclein P.H50Q, a Novel Pathogenic Mutation for Parkinson's Disease, Movement Disorders. vol. 28, No. 6, 2013, pp. 811-813.
Elodie Angot et al., Alpha-Synuclein Cell-To-Cell Transfer and Seeding in Grafted Dopaminergic Neurons in Vivo, Plos One, www.plosone.org, Jun. 2012, vol. 7, Issue 6, e39465, pp. 1-11.
Ranjita Betarbet et al., Fas-Associated Factor 1 And Parkinson's Disease, Neurobiology of Disease, 31 (2008), pp. 309-315.
Valerie Cullen, PHD et al., Acid ß-Glucosidase Mutants Linked to Gaucher Disease, Parkinson Disease, and Lewy Body Dementia Alter α-Synuclein Processing, Ann Neurol 2011; 69: 940-953, View This Article Online at wileyonlinelibrary.com. DOI:10.1002/ana.22400.

(Continued)

*Primary Examiner* — Po-Chih Chen
(74) *Attorney, Agent, or Firm* — FENWICK & WEST LLP

(57) ABSTRACT

The disclosure provides diagnostic methods and methods for treatment of conditions arising from alpha-synucleopathies. An aminopyrazole compound can be used for treatment of such conditions by lowering the amount of alpha-synuclein in cells of a subject.

5 Claims, 8 Drawing Sheets

Specification includes a Sequence Listing.

(56) References Cited

OTHER PUBLICATIONS

Michael J. Devine, MB, BS et al., Parkinson's Disease and α-Synuclein Expression, Mov Disord. Oct. 2011; 26(12); 2160-2168. DOI:10.1002/mds.23948.

Monica Federoff et al., Multiple System Atrophy: the Application of Genetics in Understanding Etiology; Clin Auton Res. Feb. 2015; 25(1): 19-36. doi:10.1007/s10286-014-0267-5.

Li Rebekah Feng et al., α-Synuclein Mediates Alterations in Membrane Conductance: a Potential Role for α-Synuclein Oligomers in Cell Vulnerability; Eur J Neurosci. Jul. 2010; 32 (1): 10-17. doi:10.1111/j.1460-9568.2010.07266.x.

Hugo J.R. Fernandes et al., Er Stress and Autophagic Perturbations Lead to Elevated Extracellular α-Synuclein in GBA-N370S Parkinson's iPSC-Derived Dopamine Neurons, Stem Cell Reports, vol. 6, 342-356, Mar. 8, 2016; http://creativecommons.org/licenses/by/4.0/.

Scarlet Gallegos et al., Features of Alpha-Synuclein That Could Explain the Progression and Irreversibility of Parkinson's Disease, Mar. 2015, vol. 9, Article 59; www.frontiersin.org (11 Pages).

Xiujie Gao et al., HSP70 Inhibits Stress-Induced Cardiomyocyte Apoptosis by Competitively Binding to FAF1, Cell Stress and Chaperones (2015) 20:653-661; DOI 10.1007/s12192-015-0589-9.

Felix Geser, MD, PHD, et al., How to Diagnose Dementia With Lewy Bodies: State of the Art, Movement Disorders, vol. 20, Suppl 12, 2005, pp. S11-S20, Published online in Wiley InterScience (www.interscience.wiley.com) DOI: 10.1002/mds.20535.

S. Gilman et al., Second Consensus Statemetn on the Diagnosis of Multiple System Atrophy, Neurology, 2008; 71; 670, DOI: 10.1212/01.wnl.0000324625.00404.15.

Michel Goedert et al., The Synucleinopathies: Twenty Years on, Journal of Parkinson's Disease 7 (2017) S51-S69; DOI 10.3233/JPD-179005.

Martin Ingelsson, Alpha-Synuclein Oligomers-Neurotoxic Molecules in Parkinson's Disease and Other Lewy Body Disorders, Frontiers in Neuroscience, Sep. 5, 2016, 10:408; doi: 10.3389/fnins.2016.00408.

Kurt A. Jellinger, MD, Neuropathological Spectrum of Synucleinopathies, Movemnt Disorders, vol. 18, Suppl. 6, 2003, pp. S2-S12; published online in Wiley InterScience (www.interscience.wiley.com) DOI 10.1002/mds.10557.

Silvia Jesús et al., GBA Variants Influence Motor and Non-Motor Features of Parkinson's Disease, Plos One 11(12): e0167749. doi: 10.1371/journal.pone.0167749.

K. Kalinderi et al., The Genetic Background of Parkinson's Disease: Current Progress and Future Prospects, Acta Neurologica Scandinavica, 2016, DOI: 10.1111.ane.12563 (13 Pages).

Hee-Jung Kim et al., Human Fas-Associated Factor 1 Interacts With Heat Shock Protein 70 and Negatively Regulates Chaperone Activity, the Journal of Biological Chemistry, vol. 280, No. 9, Issue of Mar. 4, pp. 8125-8133, 2005, DOI 10.1074/jbc.M406297200.

Daniela Kuzdas-Wood et al., Toward Translational Therapies for Multiple System Atrophy, Progress in Neurobiology, (2014) http://dx.doi.org/10.1016/j.pneurobio.2014.02.007 (17 Pages).

Youren Tong et al., α-Synuclein and LRRK2: Partners in Crime, Neuron 4, Dec. 24, 2009, DOI 10.1016/j.neuron.2009.12017. (3 Pages).

Thomas H. Langenickel et al., Pharmacodynamics, the Effect of LCZ696 (Saubitril/Valsatan) on Amyloid-ß Concentrations in Cerebrospinal Fluid in Healthy Subjects, Britich Journal of Clinical Pharamacology, 2015, DOI:10.1111/BCP.12861.

Kelvin C. Luk et al., Pathological α-Synuclein Transmission Initiates Parkinson-Like Neurodegeneration in Nontransgenic Mice, Science 338, 949 (2012); DOI: 10.1126/science.1227157.

Maria J. Martí, MD et al., Clinical Overview of the Synucleinopathies, Movement Disorders, vol. 18, Suppl. 6, 2003, pp. S21-S27; DOI:10.1002/mds.10560.

Ignacio F. Mata PHD, et al., SNCA Variant Associated With Parkinson Disease and Plasma α-Synuclein Level, Arch Neurol. Nov. 2010; 67(11):1350-1356.

Robert L. Nussbaum, Genetics of Synucleinopathies, Cold Spring Harbor Perspective in Medicine 2017; doi:10.1101/cshperspect.a024109; (9 Pages).

Abid Oueslati, Implication of Alpha-Synuclein Phosphorylation at S129 in Synucleinopathies: What Have We Learned in the Last Decade ?; Journal of Parkinson's Disease 6 (2016) 39-51; DOI:10.3233/JPD-160779.

Simona Petrucci et al., Phenotypic Spectrum of Alpha-Synuclein Mutations: New Insights From Patients and Cellular Models, Parkinsonism and Related Disorders, (2015) 1-5, http://dx.doi.org/10.1016/j.parkreldis.2015.08.015.

Edward Rockenstein et al., Accumulation of Oligomer-Prone α-Synuclein Exacerbates Synptic and Neuronal Degeneration in Vivo, Brain 2014: 137; 1496-1513; doi:10.1093/brain/awu057.

Seung-Wookryu et al., Fas-Associated Factor 1, FAF1, is a Member of Fas Death-Inducing Signaling Complex, the Journal of Biological Chemistry, vol. 278, No. 26, Issue of Jun. 27, pp. 24003-24010, 2003; DOI: 10.1074/jbc.M302200200.

Belém Sampaio-Marques et al., Sirtuins and Proteolytic Systems: Implications for Pathogenesis of Synucleinopathies, Biomolecules 2015, 5, 735-757; doi:10.3390/biom5020735.

Hiroyasu Sato et al., The Role of SER129 Phosphorylation of α-Synuclein in Neurodegeneration of Parkinson's Disease: a Review of in Vivo Models, Rev. NEUROSCI.2012; 24(2): 115-123; doi: 10.1515/revneuro-2012-0071.

David Snead et al., Alpha-Synuclein Function and Dysfunction on Cellular Membranes, Experimental Neurobiology, Dec. 2014. 23(4):292-313; http://dx.doi.org//10.5607/en.2014.23.4.292.

Maria Grazia Spilantini et al., α-Synuclein in Lewy Bodies, Nature, vol. 388, Aug. 28, 1997, pp. 839-840.

Maria Grazia Spillantini et al., α-Synuclein in Filamentous Inclusions of Lewy Bodies From Parkinson's Disease and Dementia With Lewy Bodies, Proc. Natl. Acad. Sci. USA, vol. 95, pp. 6469-6473, May 1998.

Maria Grazia Spillantini et al., The α-Synucleinopathies: Parkinson's Disease, Dementia With Lewy Bodies, and Multiple System Atrophy, Department of Neurology and Brain Repair Centre, University of Cambridge, 12 Pages.

Nadia Stefanova et al., Multiple System Atrophy: an Update; Lancet Neurol, Dec. 2009:8: 1172-78.

Jee-Won Sul et al., Accumulation of the Parkin Substrate, FAF1, Plays a Key Role in the Dopaminergic Neurodegeneration, Human Molecular Genetics, 2013; 1-16; doi:10.1093/hmg/ddt006.

E. Sidransky et al., Multicenter Analysis of Glucocerebrosidase Mutations in Parkinson's Disease, the New England Journal of Medicine, Oct. 22, 2009, 361:1651-61.

J.Q. Trojanowski et al., Proposed Neuropathological Criteria for the Post Mortem Diagnosis of Multiple System Atrophy; Neuropathology and Applied Neurobiology (2007) 33, 615-620; doi: 10.1111/j.1365-2990.2007.00907.x.

Helen Walden et al., Ubiquitin and Parkinson's Disease Through the Looking Glass of Genetics, Biochemical Journal (2017) 474, 1439-1451; DOI:10.1042/BCJ20160498.

Frank Soldner et al., Parkinson-Associated Risk Variant in Distal Enhancer of α-Synuclein Modulates Target Gene Expression; Nature, May 5, 2016, vol. 533; (20 Pages); doi:10.1038/nature17939.

Ting Wang et al., Alpha-Synuclein Toxicity in the Early Secretory Pathway: How It Drives Neurodegeneration in Parkinsons Disease; Frontiers in Neuroscience, Nov. 2015, vol. 9, Article 433; (8 Pages); doi:10.3389/FRINS.2015.00433.

Chao-Dong Wang et al., Clinicogenetics of Parkinson's Disease: a Drawing but Not Completed Picture; Neuroimmunol Neuroinflammation, vol. 1, Issue 3, Dec. 2014, pp. 115-126.

Sung-Eun Yoo et al., Design and Synthesis of Fluorescent and Biotin Tagged Probes for the Study of Molecular Actions of FAF1 Inhibitor, Bioorganic & Medicinal Chemistry Letters 26 (2016) 1169-1172; http://dx/doi.org/10.1016/j.bmcl.2016.01.045.

Changsun Yu et al., FAF1 Mediates Regulated Necrosis Through PARP1 Activation Upon Oxidative Stress Leading to Dopaminergic Neurodegeneration; Cell Death and Differentiation (2016) 23, 1873-1885; doi:10.1038/cdd.2016.99.

(56) References Cited

OTHER PUBLICATIONS

Tessandra Stewart et al., Phosphorylated α-Synuclein in Parkinson's Disease: Correlatio Depends on Disease Severity; Acta Neuropathologica Communications, (2015) 3:7; DOI 10.1186/s40478-015-0185-3.
Translation of Notice of Defects for related Israel Patent Application No. 271359, dated Oct. 21, 2021, 4 pages.
Translation of Office Action for related Japanese Application No. 2019-569256, dated Jul. 5, 2022, 6 pages.
Office Action for related Mexican Patent Application No. MX/a/2019/015273, dated Aug. 1, 2022, 12 pages.
Substantive Examination Report for related Saudi Arabian Application No. 519410863, dated Feb. 28, 2022, 10 pages.
Translation of Notice of Defects for related Israel Patent Application No. 271359, dated Jul. 26, 2022, 3 pages.
Translation of Office Action for related Russian Patent Application No. 2020101482, dated Sep. 28, 2021, 9 pages.
Translation of Search Report for related Russian Patent Application No. 2020101482, dated Sep. 28, 2021, 3 pages.
1st Reported Background Requirement for related Mexican Patent Application No. MX/a/2019/015273, dated Apr. 25, 2022, 12 pages.
Office Action for corresponding Japanese Application No. 2019-569256, dated Jul. 5, 2022, with English Summary, 7 pages.
Jang et al., abstract of "A death protein interacting with a-synuclein", Neurodegenerative Diseases, (2017) vol. 17, p. 1716.
Office Action for related Chinese Patent Application No. 201880040954.1, dated Jan. 5, 2023, 8 pages.
Office Action for related Russian Patent Application No. 2020101482/04(002107), dated Dec. 27, 2022, 18 pages.
Office Action for related Saudi Arabian Patent Application No. 519410863, dated Nov. 30, 2022, 4 pages.
Office Action for related Australian Patent Application No. 2018287319, dated Feb. 6, 2024, 6 pages.
Thomas et al., "Resistance to MPTP-Neurotoxicity in a-Synuclein Knockout Mice Is Complemented by Human a-Synuclein and Associated with Increased b-Synuclein and Akt Activation [published correction appears in PLoS One", 2012;7(3). doi: 10.1371/annotation/f743434e-a6bf-4c6c-a836-ae5af66035a4]'. PLoS One. Jan. 31, 2011; vol. 6, No. 1: p. e16706.
McCann et al., "Neuropathology of a-Synuclein Propagation and Braak Hypothesis", Movement disorders: Official Journal of the Movement Disorder Society, vol. 31, No. 2, pp. 152-160.

* cited by examiner

SEQUENCE LISTING

```
<160> NUMBER OF SEQ ID NOS: 1

<210> SEQ ID NO 1
<211> LENGTH: 19
<212> TYPE: RNA
<213> ORGANISM: Artificial Sequence
<220> FEATURE:
<223> OTHER INFORMATION: alpha-synuclein antisense RNA

<400> SEQUENCE: 1
guguuguggc acaaaccau                                                19
```

MODULATORS OF ALPHA-SYNUCLEIN

CROSS-REFERENCE TO RELATED APPLICATIONS

This application is the National Stage application of International Application PCT/IB2018/000766, filed on Jun. 19, 2018. This application claims the benefit of U.S. Provisional Application No. 62/521,758, filed Jun. 19, 2017, which is hereby incorporated by reference in its entirety. This application also contains a Sequence Listing, filename "2019 Dec. 12 seq lst 400514-20005_ST25.txt", uploaded to the file on Feb. 19, 2020.

FIELD

This disclosure relates to compositions and methods for modulating alpha-synuclein protein levels via the FAF1 gene and protein, and inhibitors of FAF1 activity to modulate the alpha-synuclein level or aggregation or modification to treat or prevent alpha-synuclein-mediated synucleinopathies. The disclosure includes associated diagnostic methods, and methods of treatment using compounds having activity of modulating FAF1 amounts or activities.

BACKGROUND

FAF1 is a protein associated with the apoptosis receptor Fas and so called Fas-Associated Factor 1. FAF1 binds to Fas upon Fas engagement with the ligand called Fas ligand (FasL) and promotes apoptosis. Thus, FAF1 is a proapoptotic protein. FAF1 has an N-terminal 200 amino acid region that binds to Fas (Ryu S W et al. 2003, Yu C et al. 2016). FAF1 then activates caspase-8 and the apoptosis pathway by activating the caspase cascade. FAF1 also activates JNK and binds to PARP1, and in this way stimulates a necrosis pathway (Yu C et al. 2016). However, in an unactivated state, FAF1 is bound to HSP70 and maintained as an inactive form (Kim H J et al, 2005, Gao X et al, 2015). FAF1 is reported to be over-expressed in postmortem tissue from Parkinson's patients (Betarbet R et al. 2008).

Synucleinopathies are a group of neurodegenerative diseases caused by the accumulation of misfolded alpha-synuclein and its aggregates such Lewy bodies (LB) or Lewy neurites (LN) inclusions. Examples include Parkinson's disease (PD), Dementia with Lewy bodies (DLB) and Multiple Systemic Atrophy (MSA) (Spillantini M G and Goedert M 2000, Marti M J et al. 2003).

Alpha-synuclein, having the gene name of SNCA, is a small cytoplasmic protein 14 kDa in size, largely located in synaptic vesicles in neuron cells, and has functions in signaling and transmission (Snead D and Eliezer D 2014). The protein is comprised of three domains, an N-terminal domain with amphipathic helices, a middle domain with beta sheets of flexible conformation and, and a C-terminal tail with many acidic residues (Gallegos S et al. 2015). The protein is known to exist in soluble form as a monomer or tetramer. However, alpha-synuclein misfolds and aggregates to form oligomers and further multimers, and further can aggregate, for various unclear reasons, into a fibrillar structure called a Lewy body and a Lewy neurite. The process includes C-terminal proteolysis, phosphorylation on serine at position 129, monoubiquitination and other modifications (Sato H et al. 2013, Oueslati A 2016). The reasons for misfolding and aggregation of alpha-synuclein include accumulation of the protein due to overexpression of the protein by gene multiplication or reduced degradation, or changes in properties of the protein itself by mutation. However, other non-genetic reasons such as environmental toxins, cellular stresses such as cellular toxicity, ER stress and oxidative stress are known, too (Rockenstein E et al. 2014, Ingelsson M 2016). In addition, SNCA locus polymorphic variants affect the alpha-synuclein level and aggregation (Mata I F et al., 2010).

The toxicity of alpha-synuclein misfolded multimers and Lewy bodies has been studied and possibly related to various pathogenic processes, particularly dysfunctions in membrane trafficking including exocytosis, ER-to-Golgi transport, ER stress, Golgi homeostasis, endocytosis, autophagy, and oxidative stress (Wang T and Hay J C 2016, Snead D et al. 2014). In addition, alpha-synuclein toxicity can also include mitochondrial toxicity and inflammation (Ingelsson M, 2016). Alpha-synuclein oligomers and Lewy bodies can interfere with the proteasome pathway, and are associated with plasma membrane disruption and pore formation, which lead to apoptosis activation in cells (Gallegos S et al. 2015).

"Synucleinopathies" are a group of neurodegenerative disorders having a range of clinical symptoms, such as Parkinson's disease (PD), Parkinson's disease with dementia (PDD), Dementia with Lewy bodies (DLB), Multiple system atrophy (MSA), Atypical parkinsonism, Atypical Parkinson's disease, and Pure autonomic failure (PAF) (Spillantini M G and Goedert M 2000, Marti M J 2003). These diseases are caused by Lewy bodies or Lewy neurites or aggregates of alpha-synuclein in neurons and glia. Clinically, they are characterized by a chronic and progressive decline in motor, cognitive, and autonomic functions, depending on the distribution of the lesions.

Parkinson's disease is the second most common neurodegenerative disease after AD (Feng L R et al. 2010), generally considered as a movement disorder. The pathological hallmark of PD is the selective progressive degeneration and loss of dopaminergic neurons in the substantia nigra (SNc), especially in the substantia nigra pars compacta (SNpc) (Luk K C et al. 2012) in midbrain responsible for the movement disorder. However, the symptoms are often accompanied by the appearance of autonomic, cognitive and psychiatric problems (Jankovic J 2008).

Another hallmark of PD is the presence of cytoplasmic inclusions termed Lewy bodies (LB) and Lewy neurites (LN) in the dopaminergic neuron cells, which are observed in postmortem tissues in more than 90 percent of Parkinson's patients. The main protein component of LBs is misfolded and aggregated alpha-synuclein (Angot E et al. 2012).

Several genetic changes, point mutations and gene multiplications of the SNCA gene are thought to cause familial Parkinson's Disease (PD) or causative for PD. The dominant inheritance of these genetic mutations suggests the gain-of-function mechanism such as aggregation due to changes of the protein properties or increased level of the protein (Devine M J et al. 2011, Appel-Cresswell S et al. 2013, Kasten M and Klein C 2013, Petrucci S et al. 2016). Certain polymorphisms within the SNCA gene or mutations in the distal enhancer region could increase its expression, and thus aggregation, and have been reported to be associated with PD (Mata I F et al. 2010, Soldner F et al. 2016).

Aside from those in the SNCA gene, many mutations are associated with Parkinson's disease and related synucleinopathies (Wang C-D and Chan P 2014, Kalinderi K et al. 2016, Federoff M 2015, Nussbaum R 2017). Some of these genes are suggested to be involved in the processing of alpha-synuclein and its accumulation. For example, a mutation in GBA (glucocerebrosidase gene) is 23% of cases of dementia with Lewy bodies and 21% with PD (Sidransky E et al. 2009, Jesus S et al. 2016). It was reported that GBA mutants increase SNCA accumulation by changing alpha-synuclein processing (Cullen V et al. 2011, Fernandes H J 2016). Other known genes that are associated with the diseases are Parkin, LRRK2, DJ-1 and PINK1. Though the roles of these genes in pathogenesis of Parkinson's and other synucleinopathies are largely unknown, these genes have functions in protein post-translational modification and processing such as ubiquitination, membrane trafficking, autophagy, and protein folding, and overexpression of alpha-synuclein is due to mutations in some of these genes (Walden H and Muqit M M K 2017, Galegos S 2015).

Dementia with Lewy body (DLB) is the second most common form of dementia, with clinical symptoms of progressive cognitive decline with dementia and fluctuating cognition, and particularly visual hallucination. Postmortem tissues show numerous Lewy bodies (LBs) in the cerebral cortex in addition to the substantia nigra, and these LBs include alpha-synuclein (Gaser F et al. 2005, Goeder M et al. 2017).

Multiple system atrophy (MSA) is a fatal neurodegenerative disease with symptoms of autonomic failure, parkinsonism, and cerebellar ataxia in different combinations (Daniela Kuzdas-Wood et al. 2014). It is a rare disease with a prevalence of 1.9-4.9/100,000 and survival of 6-9 years (Stefanova et al. 2009), and adult onset with a mean age of 57 years. Pathologically, widespread cytoplasmic inclusions (GCIs) in the glia throughout the CNS are observed (Trojanowski J Q and Revesz T 2007), which are composed of filamentous alpha-synuclein. The new proposed criteria are predominant cerebellar ataxia with the predominant motor features and neuropathologic demonstration of CNS alpha-synuclein-positive glial cytoplasmic inclusions with neurodegenerative changes in striatonigral or olivopontocerebellar structures (Gilman S 2008).

BRIEF DESCRIPTION OF THE DRAWINGS

FIG. 3A shows cells transfected with a vector control. FIG. 3B shows cells transfected with the FAF1-FLAG transgene. DAPI—DAPI staining; α-syn—anti-α-synuclein antibody staining; Ps129-α-syn—staining with anti-phosphorylated α-synuclein staining; merged—overlay of the three images.

DESCRIPTION

Figure 1:
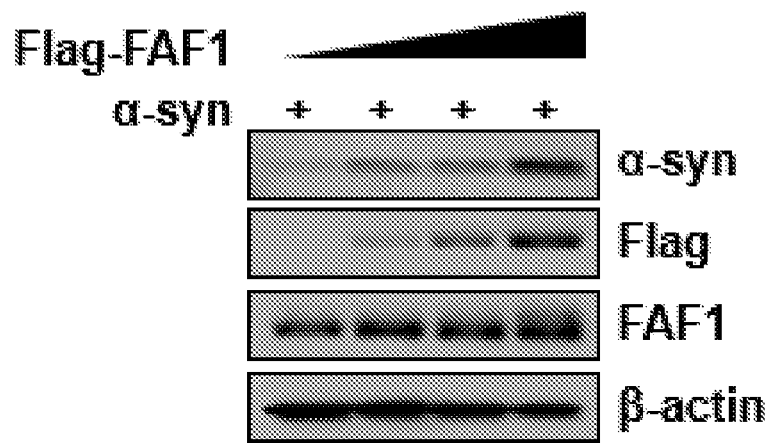
FIG. 1 illustrates the overexpression in SH-SY5Y cells of a transfected FAF1-FLAG transgene.

The invention is disclosed by surprising discovery that FAF1 increases the accumulation of alpha-synuclein in neuronal cells and its aggregation. Following these, our study confirmed that the aminopyrazole derivative FAF1 inhibitor indeed decreases the accumulation of alpha-synuclein in neuronal cells and its aggregation. The invention is also disclosed by the discovery that FAF1 inhibits autophagy through the increase of p62 protein and decrease of LC3. And our study confirmed that aminopyrazole derivative FAF1 inhibitor indeed reverses the FAF1 activity, enhancing autophagy through the decrease of p62 protein and increase of LC3. These findings are unexpected since FAF1 is a proapoptotic protein that promotes cell death and FAF1 activity on autophagy is a new discovery.

This invention relates to compositions and methods for modulating alpha-synuclein protein levels by FAF1 gene and proteins, and inhibitors for FAF1 to modulate the alpha-synuclein level or aggregation or modification to treat or prevent alpha-synuclein-mediated synucleinopathies. The disclosure includes associated diagnostic methods, and methods of treatment using compounds having an activity of modulating FAF1 levels.

The present disclosure generally relates to compositions and methods of using antibodies, peptides, nucleic acids, such as aptamers or antisense nucleic acids or siRNAs or the like, or small molecules, that alter the expression of FAF1 or the activity of the FAF1 protein in human cells that provide for the arrest or slowing down the progression of synucleinopathies. Hence, compositions and methods to provide modified gene sequences and altered protein expression and activities of FAF1 are provided, wherein the progression of the diseases is affected. Use of such compositions and methods for detecting and quantitating the level of alpha-synuclein and/or characterizing the form of synuclein in a sample for diagnostic or prognostic purposes are also disclosed.

Unexpectedly, using a transfected cell-based assay, we find that FAF1 increases the level of alpha-synuclein in cells in a dose-dependent manner. Further, increased expression of FAF1 in animals by infection with recombinant adenovirus expressing FAF1 elevates the alpha-synuclein level.

Further, a decrease of FAF1 by transfection with RNAi attenuates the alpha-synuclein level. We also disclose that FAF1 inhibits autophagy by increasing LC-3II and p62, suggesting strongly that alpha-synuclein is turned over at least partly by autophagy pathways in cells in vitro and animals.

We have developed an FAF1 inhibitor KM-819 (KR-88493, U.S. Pat. No. 7,939,550, Yoo S E et al. 2016—hereby incorporated by reference in its entirety and for all purposes). We disclose herein that the aminopyrazole compound KM-819 with the chemical name of 4-[2-(4-bromo-phenylsulfanyl)-acetylamino]-1-phenethyl-1H-pyrazole3-carboxylic acid, is an FAF1 inhibitor. We disclose herein that the aminopyrazole compound KM-819 reversed the effects of FAF1 overexpression, decreasing the alpha-synuclein in cells and animals. Taken together, the experiments in the Examples below show that FAF1 siRNA or antisense or its related gene constructs, peptides and antibodies and small molecules modulating the FAF1 could be used to modulate alpha-synuclein amounts or phosphorylation state and so to treat alpha-synuclein induced synucleinopathies.

One aspect of the present disclosure provides a method for treating a disease or condition arising from synucleinopathies comprising administering to a subject presenting symptoms of or at risk for said synucleinopathies an inhibitor of the FAF1 activity of raising the amount of alpha-synuclein or of regulating the amounts of LC-3 and p62 in cells of the subject. An effective amount that is administered is one that lowers the amount of alpha-synuclein, or that raises the amount of LC-3 and/or lowers the amount of p62 in cells of the subject, respectively.

In some implementations of this method, the inhibitor of FAF1 activity can be an aminopyrazole compound of Formula 1, or a pharmaceutically acceptable salt thereof:

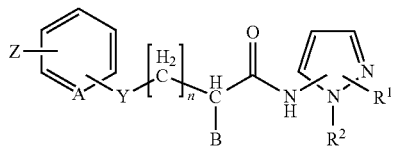

Formula 1 wherein R1 is —CO2R3, —CH2OR3, —CONR3R4 or

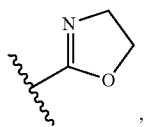

, wherein R3 and R4 are, independently of each other, H, or straight, branched or cyclic C1-C6 alkyl; R2 is —(CH2)2-phenyl; B is H, phenyl, or C1-C3 alkyl or halogen substituted phenyl; n is an integer of 0 to 2; Y is S, O, CH2, SO, SO2 or NR3R4 wherein R3 and R4 are, independently of each other, H, or straight, branched or cyclic C1-C6 alkyl; Z is H, halogen, OCH3, NO2, NH2, or straight, branched or cyclic C1-C3 alkyl; and A is CH or N.

In some instances, the aminopyrazole compound can be 4-[2-(4-bromo-phenylsulfanyl)-acetylamino]-1-phenethyl-1H-pyrazole-3-carboxylic acid or an ester or amide thereof.

Another aspect of the present disclosure provides a method for treating a disease or condition arising from synucleinopathies comprising administering to a subject presenting symptoms of or at risk for said synucleinopathies an amount of a compound that binds to FAF1 protein that is effective for decreasing the amount of α-synuclein that is phosphorylated at amino acid S129 in cells of said subject.

In some implementations of this aspect, the inhibitor of FAF1 activity can be an aminopyrazole compound of Formula 1, or a pharmaceutically acceptable salt thereof:

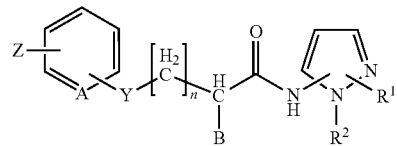

Formula 1 wherein R1 is —CO2R3, —CH2OR3, —CONR3R4 or

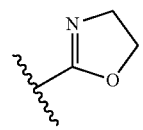

, wherein R3 and R4 are, independently of each other, H, or straight, branched or cyclic C1-C6 alkyl; R2 is —(CH2)2-phenyl; B is H, phenyl, or C1-C3 alkyl or halogen substituted phenyl; n is an integer of 0 to 2; Y is S, O, CH2, SO, SO2 or NR3R4 wherein R3 and R4 are, independently of each other, H, or straight, branched or cyclic C1-C6 alkyl; Z is H, halogen, OCH3, NO2, NH2, or straight, branched or cyclic C1-C3 alkyl; and A is CH or N.

In some instances, the aminopyrazole compound can be 4-[2-(4-bromo-phenylsulfanyl)-acetylamino]-1-phenethyl-1H-pyrazole-3-carboxylic acid or an ester or amide thereof.

In any of the treatment aspects of the disclosure, the FAF1 inhibitor can be administered orally or by injection into brain or cerebro-spinal fluid or blood or through the skin or other common practical methods, such as minipump implantation. A most convenient route is one in which the FAF1-binding compound is administered orally.

The aminopyrazole compound 4-[2-(4-bromo-phenylsulfanyl)-acetylamino]-1-phenethyl-1H-pyrazole-3-carboxylic acid has an EC50 of 1 nM for modulating LC-3 and p62 levels in cells and an EC50 of 20 μM for decreasing the amount of alpha-synuclein in cells. Accordingly, an effective amount of this compound for modulating the amount of LC-3 and p62 in brain tissue cells is an amount that provides a concentration of at least 0.5 nM preferably at least 1 nM at least 2 nM, at least 5 nM or at least 10 nM, in cells of brain tissue and an effective amount of this compound for decreasing the amount of alpha-synuclein in cells of brain tissue is an amount that provides a concentration of at least 10 nM, preferably at least 20 mM, at least 40 nM, at least 100 nM or at least 200 nM in cells of brain tissue.

Another aspect of the disclosure provides a method for diagnosing synucleinopathies or assessing risk of synucleinopathies in a subject comprising measuring the amount of FAF1 protein or the level of FAF1 activity of inhibiting autophagy mediated by LC-3 and p62 proteins in cells of a subject or a sample taken from a subject, wherein an activity level or protein level of FAF1 is greater than in a normal human population indicates development of a synucleinopathy or a risk of the subject developing a synucleinopathy.

Another aspect of the disclosure pairs the diagnosis and treatment to provide method for treating a disease or condition arising from synucleinopathies in a subject comprising administering to a subject who exhibits in cells of said subject an amount of FAF1 protein or level of FAF1 activity of inhibiting autophagy mediated by LC-3 and p62 proteins in cells of the subject, greater than in a normal human population an amount of an inhibitor of the FAF1 activity of regulating the amounts of LC-3 and p62 effective to raise the amount of LC3 and/or lower the amount of p62 in cells of the subject, or an amount of a compound that binds to FAF1 protein that is effective for decreasing the amount of α-synuclein that is phosphorylated at amino acid S129 in cells of the subject.

In some implementations of this aspect of the disclosure, the compound that binds to FAF1 or inhibits the activity of FAF1 of regulating the amount of LC-3 and p62 can be an aminopyrazole compound of Formula 1, or a pharmaceutically acceptable salt thereof:

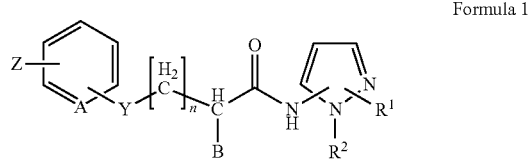

Formula 1 wherein R1 is —CO2R3, —CH2OR3, —CONR3R4 or

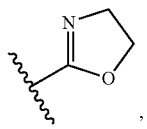

, wherein R3 and R4 are, independently of each other, H, or straight, branched or cyclic C1-C6 alkyl; R2 is —(CH2)2-phenyl; B is H, phenyl, or C1-C3 alkyl or halogen substituted phenyl; n is an integer of 0 to 2; Y is S, O, CH2, SO, SO2 or NR3R4 wherein R3 and R4 are, independently of each other, H, or straight, branched or cyclic C1-C6 alkyl; Z is H, halogen, OCH3, NO2, NH2, or straight, branched or cyclic C1-C3 alkyl; and A is CH or N.

Cerebrospinal fluid (CSF) can be sampled to determine FAF1 and alpha-synuclein levels in a subject. Time course sampling by an indwelling spinal catheter, e.g. as described by T. H. Langenickel et al., Br. J. Clin Pharmacol., vol. 81, pp. 878-890 (2016) (hereby incorporated by reference in its entirety) can used to collect CSF samples for assay of FAF1 or alpha-synuclein.

EXAMPLES

1. Increase of Alpha-Synuclein by FAF1 in Cells

FAF1 is over-expressed in SH-SY5Y cells by transfection with an FAF1 gene tagged with Flag. Overexpression is confirmed by Western blot of cell extracts using anti-Flag antibody and anti-FAF1 antibody. The rabbit anti-FAF1 antibody is purchased from Proteintech, Chicago, IL, USA, Cat. No. 10271-1-AP. The cells are cotransfected with the alpha-synuclein gene. The level of alpha-synuclein is monitored by Western blot using anti-alpha-synuclein antibody. Clearly, and unexpectedly, the level of alpha-synuclein is increased with overexpression of FAF1 (FIG. 1). Note that beta-actin level is used as an internal control. Note that there is a certain level of endogenous FAF1 protein in cells.

2. Increase of Aggregated Form of Alpha-Synuclein by FAF1 in Cells

Figure 2:
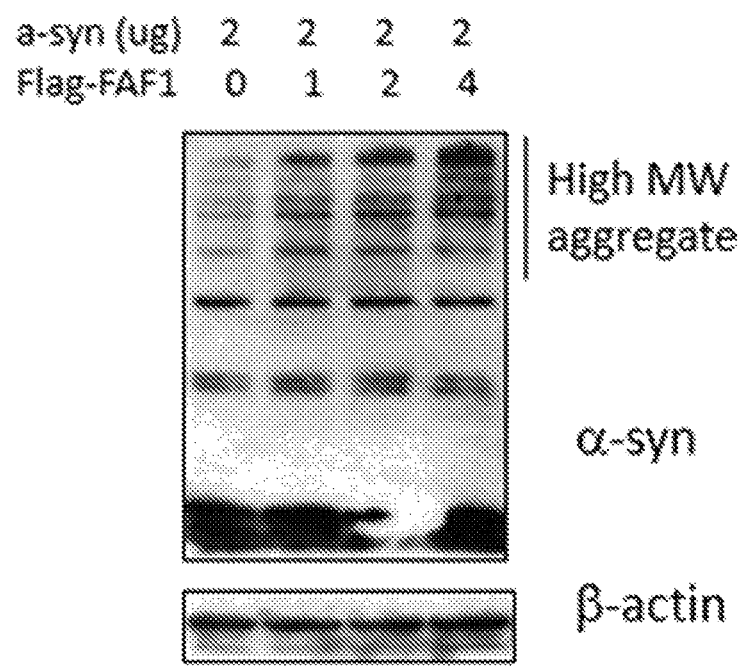
FIG. 2 shows the aggregation of α-synuclein in SH-SY5Y cells that overexpress a FAF1-FLAG transgene.

FAF1 is over-expressed in SH-SY5Y cells by transfection with FAF1 gene tagged with Flag. The cells are cotransfected with the alpha-synuclein gene. The level of aggregated form of alpha-synuclein is monitored by Western blot using anti-alpha-synuclein antibody with long exposure to film. Clearly, and unexpectedly, the level of aggregated form of alpha-synuclein is increased with overexpression of FAF1 (FIG. 2).

3. Production of Lewy Body-Like Form of Alpha-Synuclein by FAF1 in Cells

Figure 3A:
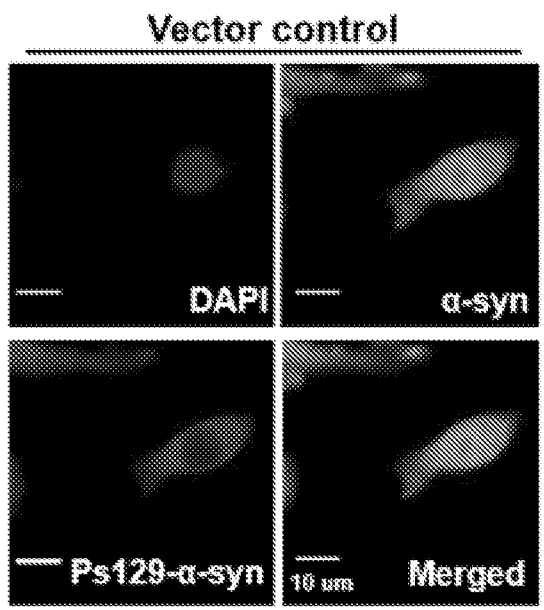
FIGS. 3A and 3B show formation of Lewy Body-like forms in SH-SY5Y cells overexpressing a transfected FAF1-FLAG transgene.
Figure 3B:
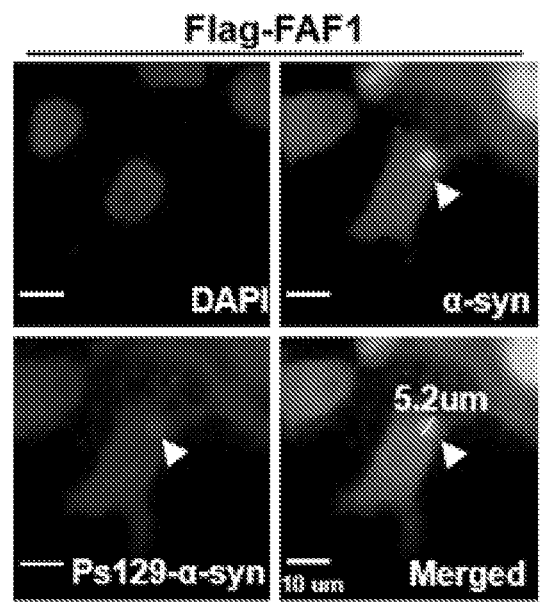

FAF1 is over-expressed in SH-SY5Y cells by transfection with FAF1 gene tagged with Flag. The cells are cotransfected with the alpha-synuclein gene. The LB-like form of alpha-synuclein is monitored by Immunofluorescence staining using anti-alpha-synuclein antibody. Clearly, and unexpectedly, the LB-like form of alpha-synuclein is observed when FAF1 is overexpressed (FIG. 3B top, arrow marker). However, the LB-like form is not observed with vector control (FIG. 3A top), demonstrating that FAF1 induces LB-like formation.

Alpha-synuclein is known to be phosphorylated at Serine residue at position 129, a probable pathological process leading to the production of Lewy body. The phosphorylated form of alpha-synuclein at position 129 is monitored by Immunofluorescence staining using anti-Ps129-alpha-synuclein antibody. Clearly, the S129 phosphorylated form of alpha-synuclein is observed when FAF1 is overexpressed in the LM-like form (FIG. 3B bottom, arrow marker). However, this phosphorylation is not observed with vector control (FIG. 3A bottom), demonstrating that FAF1 induces the alpha-synuclein phosphorylation at serine residue at position 129.

4. Increase of Alpha-Synuclein by FAF1 in Mice

Figure 4:
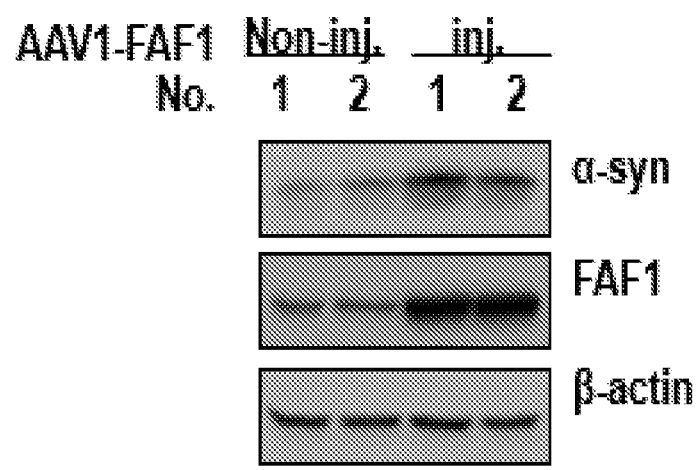
FIG. 4 illustrates overexpression of FAF1 in midbrain of mice having a FAF1-expressing adenovirus construct microinjected into midbrain tissue.

FAF1 is over-expressed in mice by stereotype injection by a usual method with recombinant adenovirus containing FAF1 gene into their midbrain region. Over-expression is confirmed by Western blot of midbrain tissue extracts using anti-FAF1 antibody. Midbrain is the tissue that has substantianigral dopaminergic neurons known to affect movement in synucleinopathies. Two mice are injected with FAF1 adenovirus and two non-injected mice are used as controls. The level of alpha-synuclein is monitored by Western blot using anti-alpha-synuclein antibody. Clearly, the increased level of alpha-synuclein is correlated with overexpression of FAF1 (FIG. 4).

5. Decrease of Alpha-Synuclein by FAF1 siRNA in Cells

Figure 5:
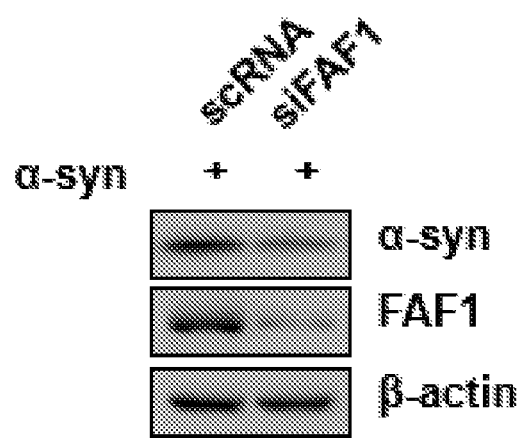
FIG. 5 shows attenuation of FAF1 expression in SH-SY5Y cells cotransfected with an α-synuclein gene and a corresponding siRNA.

FAF1 expression is attenuated by treating SH-SY5Y cells with siRNA (sequence: GUGUUGUGGCACAAACCAU) and reduction in FAF level is confirmed by Western blot of cell extracts using anti-FAF1 antibody. The cells are cotransfected with the alpha-synuclein gene. The level of alpha-synuclein is monitored by Western blot using anti-alpha-synuclein antibody. Clearly, the level of alpha-synuclein is decreased with FAF1 siRNA treatment (FIG. 5). On the other hand, treatment with control siRNA (scRNA, degenerate sequence) does not decrease the alpha-synuclein level.

6. FAF1 is a Suppressor of Autophagy.

Alpha-synuclein is known to be degraded by various pathways in cells, including proteasome, autophagy, and chaperone-mediated autophagy (Sampaio-Marques B and Ludovico P 2015). FAF1 is over-expressed by transfection in SH-SY5Y cells and various proteins involved in protein degradation pathways are assayed by Western blots (FIG. 6).

Figure 6:
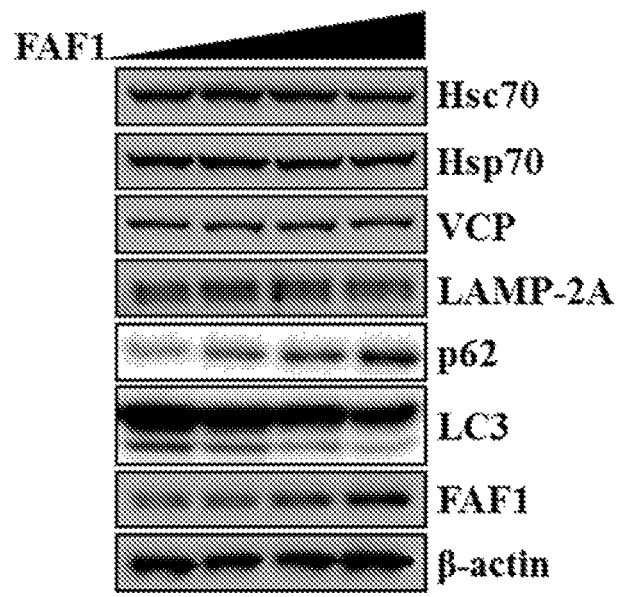
FIG. 6 shows changes in p62 and LC3 protein expression in SH-SY5Y cells transfected with a FAF1 gene.

As shown in FIG. 6, p62 protein is increased and LC3 is decreased with overexpression of FAF1, indicating that FAF1 suppresses autophagy. Note that all other proteins are unchanged. This change mediates autophagy as described (Sampaio-Marques B and Ludovico P 2015). These data demonstrate that FAF1 increases alpha-synuclein through suppressing the autophagy pathway.

7. KM-819(KR-33493) is an FAF1 Inhibitor

Figure 7:
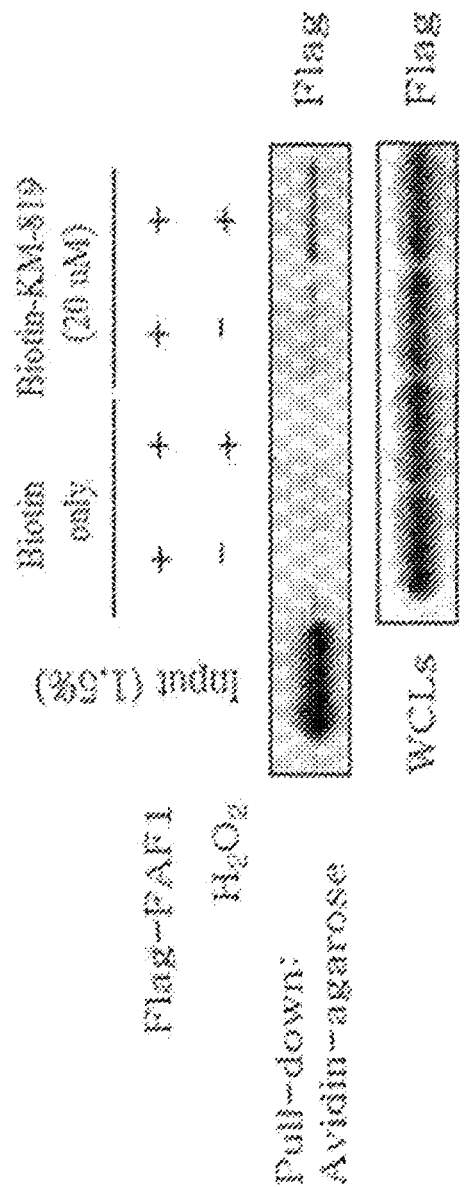
FIG. 7 shows KM-819 binding to FAF1 in cells transfected with a FAF1-FLAG construct.
Figure 8:
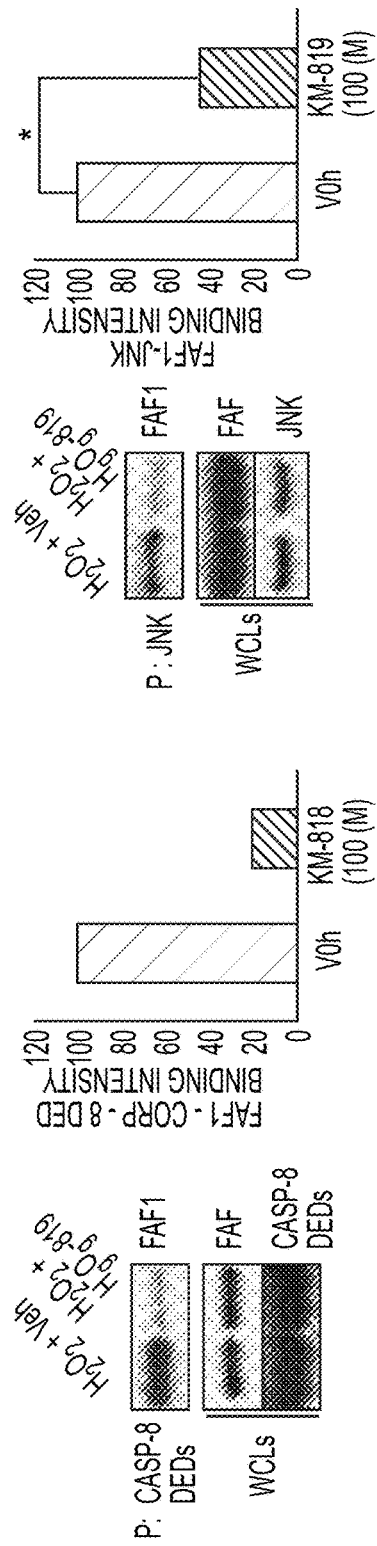
FIG. 8 shows inhibition of formation of FAF1-Caspase 8 and of FAF1-JNK complexes by KM-819 in cell extracts.

KM-819 (KR-33493, 4-[2-(4-bromo-phenylsulfanyl)-acetylamino]-1-phenethyl-1H-pyrazole-3-carboxylic acid) is an aminopyrazole derivative described in the prior art for ischemic cell death inhibitor (U.S. Pat. No. 7,939,550, Yoo S E et al. 2016). The inhibition of FAF1 by KM-819 is confirmed by binding of KM-819 to FAF1 as described and in FIG. 7). Also, the inhibition of FAF1 by KM-819 is confirmed by inhibition of the FAF1 downstream targets in cells including the apoptosis path proteins Caspase 8 and JAK (FIG. 8). The compound showed 70% inhibition of apoptosis at 10 uM in assays of ischemic cell death, the deoxy-glucose induced hypoxia-mediated apoptosis (U.S. Pat. No. 7,939,550).

KM-819 binding to FAF1 is confirmed by pulldown assay in SH-SY6H cell extracts using biotin-labeled KM-819 as described (Yoo S E et al. 2016). Cells are transfected with FAF1 flag-tagged. The FAF1-KM-819 complex formed are precipitated using avidin-coated agarose. The precipitated FAF1 in the complex is measured by Western blot using anti-Flag antibody. Clearly, the FAF1 binds to KM-819 when the cells are stressed by hydrogen peroxide and thus FAF1 is activated. Note that the total FAF1 level in the whole cell extracts (WCLs) is measured as controls.

FAF1 activates apoptotic stress by various stimuli through activation of caspase cascade and necrosis as described (Yu C et al. 2016). The direct targets of FAF1 are caspase 8 and JNK in these two pathways, respectively. And the step of this activation is forming these complexes followed by activation of the downstream targets.

The inhibition of the complex formation of FAF1-Caspase 8 and FAF1-JNK by KM-819 is confirmed by the usual immunoprecipitation assays using a caspase8 DED antibody and a JNK antibody, and bound and precipitated FAF1 are measured by Western blot using anti-FAF1 antibody. Clearly, KM-819 inhibits the complex formation effectively, about 80% inhibition at 0.1 uM (FIG. 8).

Figure 9:
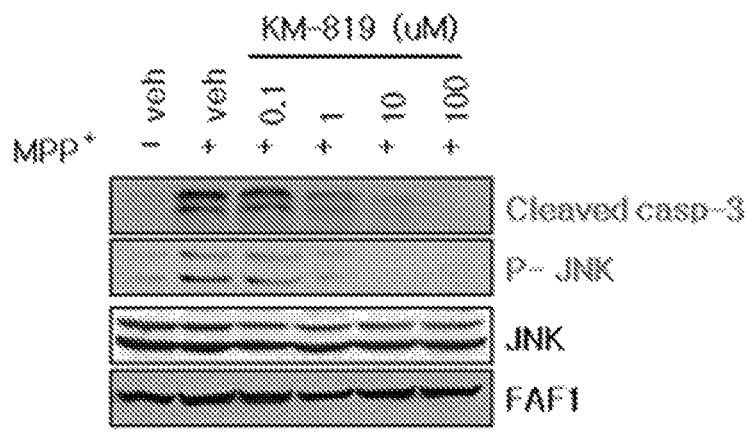
FIG. 9 shows inhibition of Caspase 8 activities of Caspase 3 cleavage and JNK phosphorylation by KM-819 in cell extracts.

The inhibition of activation of Caspase 8 and JNK by KM-819 is confirmed by assaying the cleavage of the Caspase 8 substrate, Caspase 3, and autophosphorylation of JNK, respectively (FIG. 9). The cells are treated with different concentration of KM-819 as indicated and the levels of cleaved Caspase 3 and autophosphorylated form of JNK are measured by Western blot using anti-Caspase 3 antibody and anti-phospho-JNK antibody, respectively. Clearly, KM-819 inhibits the activity of Caspase 8 and JNK activation (FIG. 9). IC50 of Caspase 8 activation of KM-819 is 0.73 uM and IC50 of JNK activation of KM-819 is 0.25 uM.

8. KM-819 Enhances Autophagy

Alpha-synuclein is known to be degraded by various pathways in cells, including via proteasomes, autophagy, and chaperone-mediated autophagy (Sampaio-Marques B and Ludovico P 2015). FAF1 suppresses autophagy.

Figure 10:
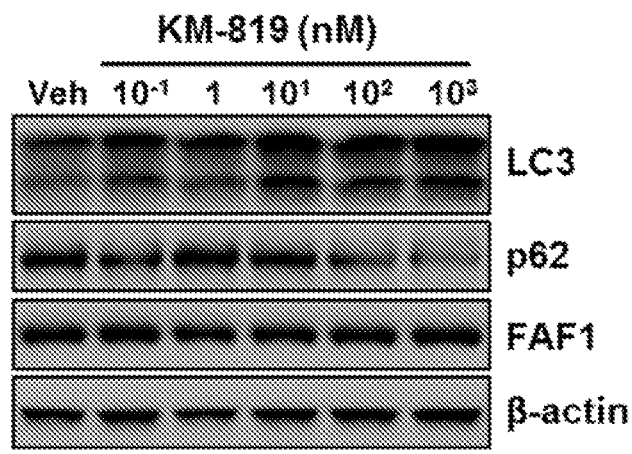
FIG. 10 shows decreasing amounts of p62 protein and increasing amounts of LC3 protein in SH-SY5Y cells overexpressing FAF1 and treated with KM-819.

To confirm that the FAF1 inhibitor inhibits the activity of FAF1-mediated autophagy suppression, SH-SY5Y cells overexpressing FAF1 are treated with KM-819 as indicated and the LC3 and p62 level are measured by Western blot (FIG. 10). KM-819 decreases p62 protein and increases LC3, demonstrating KM-819 promotes autophagy pathway. EC50 for autophagy promotion of KM-819 is 1 nM.

9. Decrease of Alpha-Synuclein by FAF1 Inhibitor in Cells

Figure 11:
FIG. 11 shows decreasing α-synuclein protein in cells co-transfected with a FAF1-FLAG expression construct and a α-synuclein-GFP (Green Fluorescent Protein) expression construct.

To confirm if FAF1 inhibitor decreases the alpha-synuclein level in cells, SH-SY5Y cells are treated with the FAF1 inhibitor KM-819 (KR-88493, U.S. Pat. No. 7,939, 550, Yoo S E et al. 2016). Cells are co-transfected with genes encoding FAF1 tagged with Flag and alpha-synuclein tagged with GFP. The alpha-synuclein level is measured by Western blot of cell extracts using anti-GFP antibody. The FAF1 level is measured by Western blot of cell extracts using anti-Flag antibody. Clearly, the level of alpha-synuclein is decreased upon treatment with FAF1 inhibitor (FIG. 11). The IC50 is 20 nM, and the inhibition is more than 95% at 10 uM. This is much higher efficacy compared to the apoptosis inhibition activity measured in the prior art, 70% inhibition at 10 uM. Note that FAF1 level itself is not changed by treatment with FAF1 inhibitor.

10. Decrease of Alpha-Synuclein by FAF1 Inhibitor in Midbrain in Mice

To see the effects of FAF1 inhibitor on the alpha-synuclein level in animals, alpha-synuclein overexpressing transgenic mice are treated with FAF1 inhibitor KM-819. The transgenic animals are mice strain that has human alpha-synuclein mutant gene A53T under the Prion gene promoter (Human-synuclein-harboring familial Parkinson's (Lee M K et al. 2002).

Figure 12:
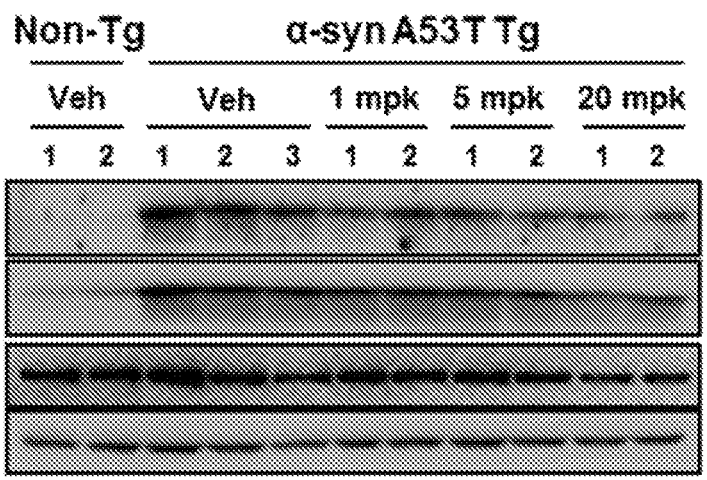
FIG. 12 shows decreasing amount of α-synuclein and in the amount of S129 phosphorylated α-synuclein in midbrain tissue of transgenic mice overexpressing FAF1 after administration of KM-819.

Three months old mice are administered with KM-819 orally at the dose 1, 5, and 10 mg/kg/day for 9 days. Two non-transgenic mice (non-Tg) are used as a control, and three transgenic mice (alpha-syn A53T Tg) are administered only with the vehicle without KM-819. And two mice are used for each dosing of KM-819. Animals are sacrificed and midbrain tissues are isolated and made extracts. Alpha-synuclein, S129 phosphorylated form of alpha-synuclein, and FAF1 are measured by Western blot using an anti-alpha-synuclein antibody, P-alpha-syn antibody and FAF1 antibody, respectively. Clearly, both the level of alpha-synuclein and its phosphorylated form are decreased upon treatment with FAF1 inhibitor KM-819, demonstrating the FAF1 inhibitor decreases the alpha-synuclein accumulation in animal (FIG. 12). Note that FAF1 level itself is not changed by treatment with FAF1 inhibitor. Note that beta-actin level is used as an internal control.

11. Decrease of Alpha-Synuclein by FAF1 Inhibitor in Hippocampus in Mice

To see the effects of FAF1 inhibitor on the alpha-synuclein level in animals, alpha-synuclein overexpressing transgenic mice are treated with FAF1 inhibitor KM-819. The transgenic animals are mice strain that has human alpha-synuclein mutant gene A53T under the Prion gene promoter (Human-synuclein-harboring familial Parkinson's (Lee M K et al. 2002).

Figure 13:
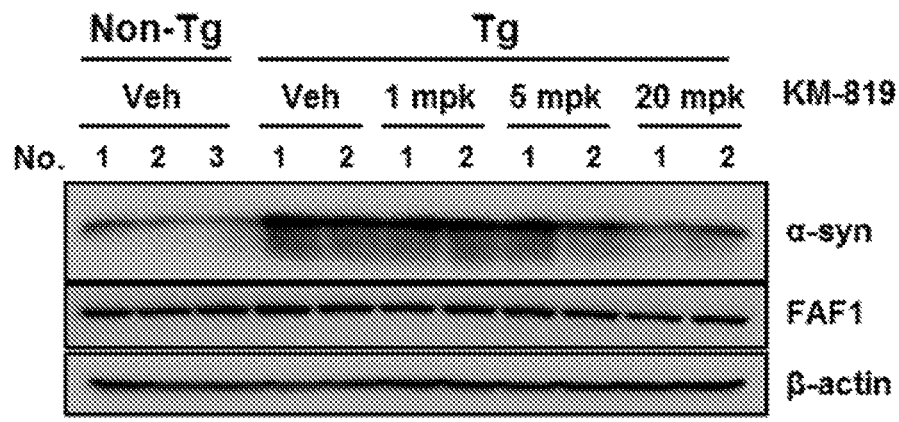
FIG. 13 shows decreasing amount of α-synuclein in hippocampus of transgenic mice overexpressing FAF1 after administration of KM-819.

Three months old mice are administered with KM-819 orally at the dose 1, 5, and 10 mg/kg/day for 9 days. Three non-transgenic (non-Tg) mice are used as a control, and two transgenic mice (alpha-syn A53T Tg) are administered only with the vehicle without KM-819. And two mice are used for each dosing of KM-819. Animals are sacrificed and hippocampus tissues are isolated and made extracts. Alpha-synuclein and FAF1 are measured by Western blot using anti-alpha-synuclein antibody and FAF1 antibody, respectively. Clearly, the level of alpha-synuclein is decreased upon treatment with FAF1 inhibitor KM-819, demonstrating the FAF1 inhibitor decreases the alpha-synuclein accumulation in animal (FIG. 13).

12. Decrease of Alpha-Synuclein by FAF1 Inhibitor in Cortex in Mice

To see the effects of FAF1 inhibitor on the alpha-synuclein level in animals, alpha-synuclein overexpressing transgenic mice are treated with FAF1 inhibitor KM-819. The transgenic animals are mice strain that has human alpha-synuclein mutant gene A53T under the Prion gene promoter (Human-synuclein-harboring familial Parkinson's (Lee M K et al. 2002).

Figure 14:
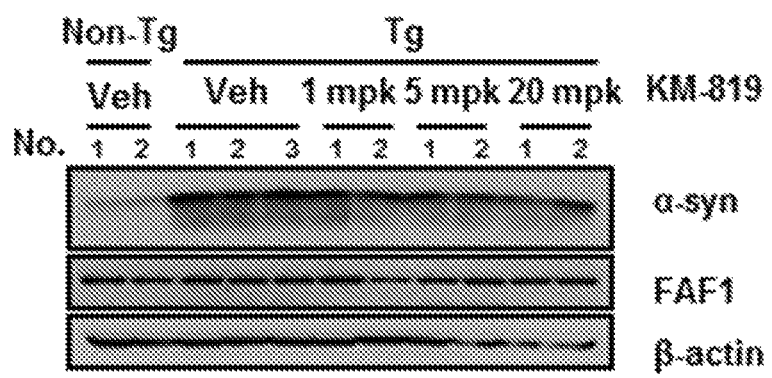
FIG. 14 shows decreasing amount of α-synuclein in cerebral cortex of transgenic mice overexpressing FAF1 after administration of KM-819.

Three months old mice are administered with KM-819 orally at the dose 1, 5, and 10 mg/kg/day for 9 days. Two non-transgenic mice (non-Tg) are used as a control, and two transgenic mice (alpha-syn A53T Tg) are administered only with the vehicle without KM-819. And two mice are used for each dosing of KM-819. Animals are sacrificed and cortex tissues are isolated and made extracts. Alpha-synuclein is measured by Western blot using anti-alpha-synuclein antibody. Clearly, the level of alpha-synuclein is decreased upon treatment with the FAF1 inhibitor KM-819, demonstrating the FAF1 inhibitor decreases the alpha-synuclein accumulation in animal (FIG. 14).

13. Decrease of Alpha-Synuclein by FAF1 Inhibitor in Cerebellum in Mice

To see the effects of FAF1 inhibitor on the alpha-synuclein level in animals, alpha-synuclein overexpressing transgenic mice are treated with FAF1 inhibitor KM-819. The transgenic animals are mice strain that has human alpha-synuclein mutant gene A53T under the Prion gene promoter (Human-synuclein-harboring familial Parkinson's (Lee M K et al. 2002).

Figure 15:
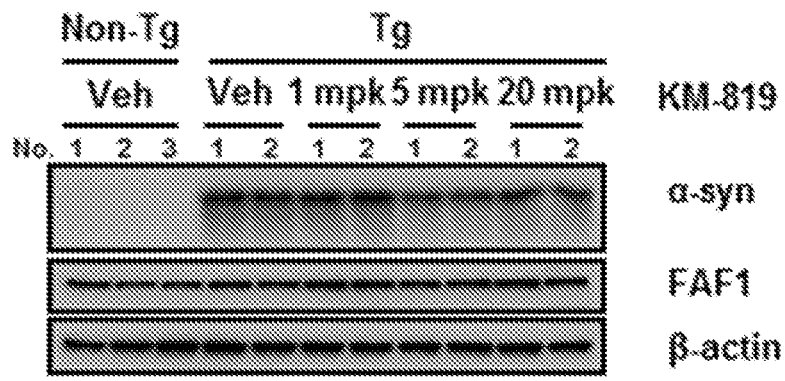
FIG. 15 shows decreasing amount of α-synuclein in cerebellum of transgenic mice overexpressing FAF1 after administration of KM-819.

Three months old mice are administered with KM-819 orally at the dose 1, 5, and 10 mg/kg/day for 9 days. Three non-transgenic mice (non-Tg) are used as a control, and two transgenic mice (alpha-syn A53T Tg) are administered only with the vehicle without KM-819. And two mice are used for each dosing of KM-819. Animals are sacrificed and cerebellum tissues are isolated and made extracts. Alpha-synuclein and FAFlare measured by Western blot using anti-alpha-synuclein antibody and FAF1 antibody, respectively. Clearly, both the level of alpha-synuclein is decreased upon treatment with FAF1 inhibitor KM-819, demonstrating the FAF1 inhibitor decreases the alpha-synuclein accumulation in animal (FIG. 15).

14. Decrease of Alpha-Synuclein by FAF1 Inhibitor in Striatum in Mice

To see the effects of FAF1 inhibitor on the alpha-synuclein level in animals, alpha-synuclein overexpressing transgenic mice are treated with FAF1 inhibitor KM-819. The transgenic animals are mice strain that has human alpha-synuclein mutant gene A53T under the Prion gene promoter (Human-synuclein-harboring familial Parkinson's (Lee M K et al. 2002).

Figure 16:
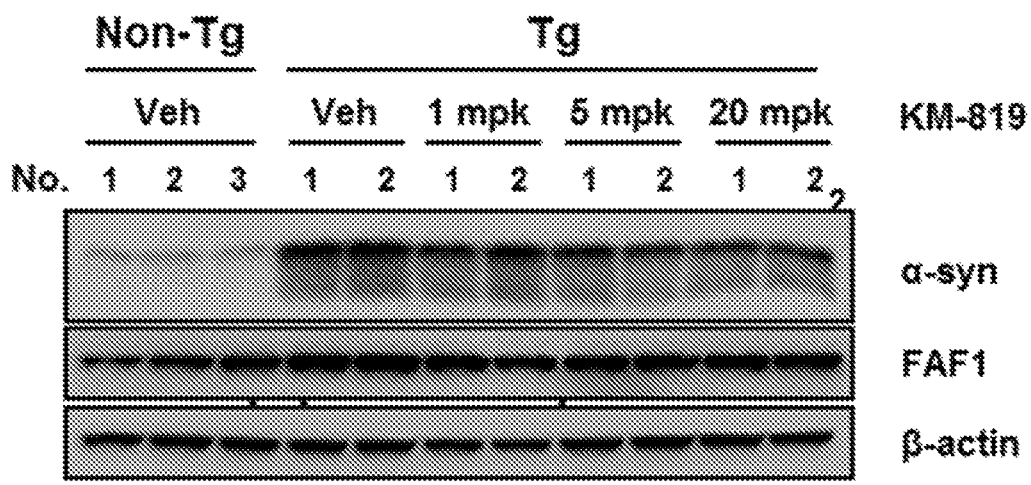
FIG. 16 shows decreasing amount of α-synuclein in striatum of transgenic mice overexpressing FAF1 after administration of KM-819.

Three months old mice are administered with KM-819 orally at the dose 1, 5, and 10 mg/kg/day for 9 days. Three non-transgenic (non-Tg) mice are used as a control, and two transgenic mice (alpha-syn A53T Tg) are administered only with the vehicle without KM-819. And two mice are used for each dosing of KM-819. Animals are sacrificed and striatum tissues are isolated and made extracts. Alpha-synuclein and FAF1 are measured by Western blot using anti-alpha-synuclein antibody and FAF1 antibody, respectively. Clearly, the level of alpha-synuclein is decreased upon treatment with FAF1 inhibitor KM-819, demonstrating the FAF1 inhibitor decreases the alpha-synuclein accumulation in animal (FIG. 16).

EMBODIMENTS

Embodiment 1

A method for treating a disease or condition arising from synucleinopathies comprising administering to a subject presenting symptoms of or at risk for said synucleinopathies an effective amount of an inhibitor of FAF1 activity of raising the amount of alpha-synuclein or an effective amount of an inhibitor of the FAF1 activity of regulating the amounts of LC-3 and p62.

Embodiment 2

The method of embodiment 1, in which the inhibitor of FAF1 activity is an aminopyrazole compound of Formula 1, or a pharmaceutically acceptable salt thereof:

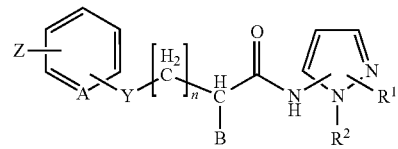

Formula 1 wherein R1 is —CO2R3, —CH2OR3, —CONR3R4 or

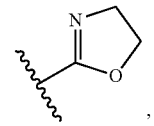

, wherein R3 and R4 are, independently of each other, H, or straight, branched or cyclic C1-C6 alkyl; R2 is —(CH2)2-phenyl; B is H, phenyl, or C1-C3 alkyl or halogen substituted phenyl; n is an integer of 0 to 2; Y is S, O, CH2, SO, SO2 or NR3R4 wherein R3 and R4 are, independently of each other, H, or straight, branched or cyclic C1-C6 alkyl; Z is H, halogen, OCH3, NO2, NH2, or straight, branched or cyclic C1-C3 alkyl; and A is CH or N.

Embodiment 3

The method of embodiment 1, in which the aminopyrazole compound is 4-[2-(4-bromo-phenylsulfanyl)-acetylamino]-1-phenethyl-1H-pyrazole-3-carboxylic acid or an ester or amide thereof.

Embodiment 4

A method for treating a disease or condition arising from synucleinopathies comprising administering to a subject presenting symptoms of or at risk for said synucleinopathies an amount of a compound that binds to FAF1 protein that is effective for decreasing the amount of α-synuclein that is phosphorylated at amino acid S129 in cells of said subject.

Embodiment 5

The method of embodiment 4, in which the compound that binds to FAF1 protein is an aminopyrazole compound of Formula 1, or a pharmaceutically acceptable salt thereof:

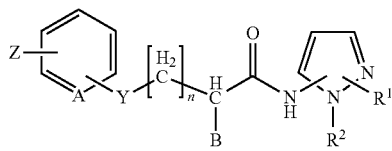

Formula 1 wherein R1 is —CO2R3, —CH2OR3, —CONR3R4 or

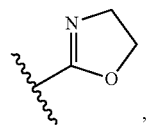

, wherein R3 and R4 are, independently of each other, H, or straight, branched or cyclic C1-C6 alkyl; R2 is —(CH2)2-phenyl; B is H, phenyl, or C1-C3 alkyl or halogen substituted phenyl; n is an integer of 0 to 2; Y is S, O, CH2, SO, SO2 or NR3R4 wherein R3 and R4 are, independently of each other, H, or straight, branched or cyclic C1-C6 alkyl; Z is H, halogen, OCH3, NO2, NH2, or straight, branched or cyclic C1-C3 alkyl; and A is CH or N.

Embodiment 6

The method of embodiment 4, in which the aminopyrazole compound is 4-[2-(4-bromo-phenylsulfanyl)-acetylamino]-1-phenethyl-1H-pyrazole-3-carboxylic acid or an ester or amide thereof.

Embodiment 7

The method of any one of embodiments 1 to 3, in which the FAF1 inhibitor is administered orally or by injection into brain or blood or through the skin.

Embodiment 8

The method of any one of embodiments 4 to 6, in which the compound that binds to FAF1 protein is administered orally or by injection into brain or blood or through or skin other common practical methods. In which the FAF1-binding compound is administered orally.

Embodiment 9

A method for diagnosing synucleinopathies or assessing risk of synucleinopathies in a subject comprising measuring FAF1 activity or FAF1 level of inhibiting autophagy comprising LC-3 and p62 proteins in cells of a subject, or in any other sample from a subject, wherein an activity level or protein level of FAF1 is greater than normal people indicating development of synucleinopathies or a risk of the subject developing synucleinopathies.

Embodiment 10

A method for treating a disease or condition arising from synucleinopathies in a subject comprising administering to a subject who exhibits in cells of said subject FAF1 activity or FAF1 level of inhibiting autophagy comprising LC-3 and p62 proteins in cells of a subject, wherein an activity level or protein level of FAF1 is greater than normal people indicating development of synucleinopathies or a risk of the subject developing synucleinopathies, or an amount of a compound that binds to FAF1 protein that is effective for decreasing the amount of α-synuclein that is phosphorylated at amino acid S129 in cells of said subject.

Embodiment 11

The method of embodiment 10, in which an aminopyrazole compound of Formula 1, or a pharmaceutically acceptable salt thereof:

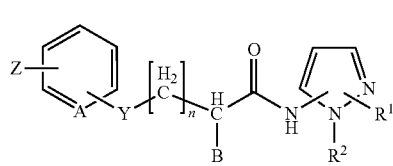

Formula 1 wherein R1 is —CO2R3, —CH2OR3, —CONR3R4 or

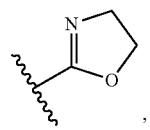

, wherein R3 and R4 are, independently of each other, H, or straight, branched or cyclic C1-C6 alkyl; R2 is —(CH2)2-phenyl; B is H, phenyl, or C1-C3 alkyl or halogen substituted phenyl; n is an integer of 0 to 2; Y is S, O, CH2, SO, SO2 or NR3R4 wherein R3 and R4 are, independently of each other, H, or straight, branched or cyclic C1-C6 alkyl; Z is H, halogen, OCH3, NO2, NH2, or straight, branched or cyclic C1-C3 alkyl; and A is CH or N; is administered.

Embodiment 12

A method for preparing a medicament comprising mixing an aminopyrazole compound of Formula 1, or a pharmaceutically acceptable salt thereof:

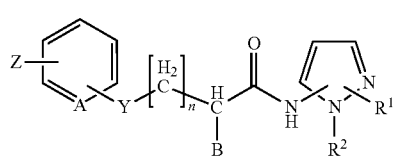

Formula 1 wherein R1 is —CO2R3, —CH2OR3, —CONR3R4 or

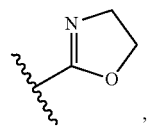

, wherein R3 and R4 are, independently of each other, H, or straight, branched or cyclic C1-C6 alkyl; R2 is —(CH2)2-phenyl; B is H, phenyl, or C1-C3 alkyl or halogen substituted phenyl; n is an integer of 0 to 2; Y is S, O, CH2, SO, SO2 or NR3R4 wherein R3 and R4 are, independently of each other, H, or straight, branched or cyclic C1-C6 alkyl; Z is H, halogen, OCH3, NO2, NH2, or straight, branched or cyclic C1-C3 alkyl; and A is CH or N; and a pharmaceutically acceptable carrier.

Embodiment 13

The method of embodiment 12, wherein the medicament is for treating a disease or condition arising from synucleinopathies in a subject.

Embodiment 14

Use of an aminopyrazole compound of Formula 1, or a pharmaceutically acceptable salt thereof:

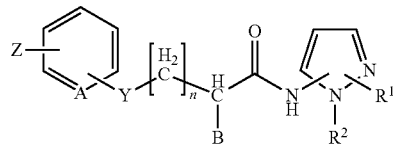

Formula 1 wherein R1 is —CO2R3, —CH2OR3, —CONR3R4 or

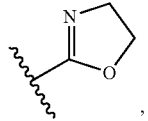

, wherein R3 and R4 are, independently of each other, H, or straight, branched or cyclic C1-C6 alkyl; R2 is —(CH2)2-phenyl; B is H, phenyl, or C1-C3 alkyl or halogen substituted phenyl; n is an integer of 0 to 2; Y is S, O, CH2, SO, SO2 or NR3R4 wherein R3 and R4 are, independently of each other, H, or straight, branched or cyclic C1-C6 alkyl; Z is H, halogen, OCH3, NO2, NH2, or straight, branched or cyclic C1-C3 alkyl; for treating a disease or condition arising from a synucleinopathy in a subject.

Embodiment 15

The use of embodiment 14, in which the amino pyrazole compound is effective to inhibit FAF1 activity to raise the amount of alpha-synuclein in a cell of the subject in a cell of a sample from the subject or is effect to increase autophagy mediated by LC-3 and p62 proteins in a cell of the subject or in a cell of a sample from the subject or is effective to decrease the amount of α-synuclein that is phosphorylated at amino acid S129 in a cell of the subject or in a cell of a sample from the subject.

REFERENCES

Appel-Cresswell S, Vilarino-Guell C, Encarnacion M, Sherman H, Yu I, Shah B, Weir D, Thompson C, Szu-Tu C, Trinh J, Aasly J O, Rajput A, Rajput A H, Jon Stoessl A, Farrer M J. 2013. Alpha-synuclein p.H50Q, a novel pathogenic mutation for Parkinson's disease. Mov. Disord. 28, 811-3.

Angot E, Steiner J A, Lema Tome C M, Ekstrom P, Mattsson B, Bjorklund A, Brundin P. 2012. Alpha-synuclein cell-to-cell transfer and seeding in grafted dopaminergic neurons in vivo. PloS ONE 7:e39465.

Betarbet R, Anderson L R, Gearing M, Hodges T R, Fritz J J, Lah J J, Levey A I. 2008. Fas-associated factor 1 and Parkinson's disease. Neurobiol. Dis. 31, 309-15.

Cullen V, Sardi S P, Ng J, Xu Y H, Sun Y, Tomlinson J J, Kolodziej P, Kahn I, Saftig P, Woulfe J, Rochet J C, Glicksman M A, Cheng S H, Grabowski G A, Shihabuddin L S, Schlossmacher M G. 2011. Acid β-glucosidase mutants linked to Gaucher disease, Parkinson disease, and Lewy body dementia alter α-synuclein processing. Ann. Neurol. 69, 940-53.

Devine M J, Gwinn K, Singleton A, Hardy J. 2011. Parkinson's disease and α-synuclein expression. Mov. Disord. 26, 2160-8.

Federoff M, Schottlaender L V, Houlden H, and Singleton A. 2015 Multiple system atrophy: the application of genetics in understanding etiology. Clin. Auton. Res. 25, 19-36.

Feng L R, Federoff H J, Vicini S, and Maguire-Zeiss K A. 2010. Alpha-synuclein mediates alterations in membrane conductance: a potential role for alpha-synuclein oligomers in cell vulnerability. Eur. J. Neurosci. 32, 10-17.

Fernandes H J, Hartfield E M, Christian H C, Emmanoulidou E, Zheng Y, Booth H, Bogetofte H, Lang C, Ryan B J, Sardi S P, Badger J, Vowles J, Evetts S, Tofaris G K, Vekrellis K, Talbot K, Hu M T, James W, Cowley S A, Wade-Martins R. 2016. ER stress and autophagic perturbations lead to elevated extracellular α-synuclein in GBA-N370S Parkinson's iPSC-derived dopamine neurons. Stem Cell Reports. 6, 342-56.

Gallegos S, Pacheco C, Peters C, Opazo C M, Aguayo L G. 2015. Features of alpha-synuclein that could explain the progression and irreversibility of Parkinson's disease. Front Neurosci. 9, 59.

Gao X, Liu W, Huang L, Zhang T, Mei Z, Wang X, Gong J, Zhao Y, Xie F, Ma J, Qian L. 2015. HSP70 inhibits stress-induced cardiomyocyte apoptosis by competitively binding to FAF1. Cell Stress Chaperones. 20, 653-61.

Geser F, Wenning G K, Poewe W, McKeith I. 2005. How to diagnose dementia with Lewy bodies: state of the art. Mov. Disord. 12, S11-20.

Gilman S, Wenning G K, Low P A, Brooks D J, Mathias C J, Trojanowski J Q, Wood N W, Colosimo C, Durr A, Fowler C J, Kaufmann H, Klockgether T, Lees A, Poewe W, Quinn N, Revesz T, Robertson D, Sandroni P, Seppi K, Vidailhet M. 2008. Second consensus statement on the diagnosis of multiple system atrophy. Neurology 71, 670-676.

Goedert M, Jakes R, and Spillantinib M G. 2017. The Synucleinopathies: twenty years on. J. Parkinsons Dis. 7, S51-S69.

Ingelsson M. 2016. Alpha-synuclein oligomers-neurotoxic molecules in Parkinson's Disease and other Lewy Body disorders. Frontiers in Neuroscience Volume 10, Article 408

Jankovic J. 2008. Parkinson's disease: clinical features and diagnosis. J. Neurol. Neurosurg. Psychiatry 79, 368-376.

Jellinger K A. 2003. Neuropathological spectrum of synucleinopathies. Mov. Disord. 6, S2-12.

Jesus S, Huertas I, Bernal-Bernal I, Bonilla-Toribio M, Caceres-Redondo M T, Vargas-Gonzalez L, Gómez-Llamas M, Carrillo F, Calderón E, Carballo M, Gómez-Garre P, Mir P. 2016. GBA variants Influence motor and non-motor features of Parkinson's disease. PLoS One. 11:e0167749.

Kalinderi K, Bostantjopoulou S, Fidani L. 2016. The genetic background of Parkinson's disease: current progress and future prospects. Acta Neurol. Scand. 134: 314-326.

Kasten M, Klein C. 2013. The many faces of alpha-synuclein mutations. Mov. Disord. 28, 697-701.

Kim H J, Song E J, Lee Y S, Kim E, Lee K J. 2005. Human Fas-associated factor 1 interacts with heat shock protein 70 and negatively regulates chaperone activity. J. Biol. Chem. 280, 8125-33.

Kuzdas-Wood D, Stefanova N, Jellinger K A, Seppi K, Schlossmacher M G, Poewe W, Wenning G K. 2014. Towards translational therapies for multiple system atrophy. Progress in Neurobiology 118, 19-35.

Lee M K, Stirling W, Xu Y, Xu X, Qui D, Mandir A S, Dawson T M, Copeland N G, Jenkins N A, Price D L. 2002. Human-synuclein-harboring familial Parkinson's disease-linked Ala-53 Thr mutation causes neurodegenerative disease with alpha-synuclein aggregation in transgenic mice. PNAS 99, 8968-8973.

Langenickel, T. H., et al. 2016. The effect of LCZ696 (sacubitril/valsartan) on amyloid-β concentrations in cerebrospinal fluid in healthy subjects. Br. J. Clin Pharmacol. 81, 878-890.

Luk K C, Kehm V, Carroll J, Zhang B, O'Brien P, Trojanowski J Q, Lee V M. 2012. Pathological α-synuclein transmission initiates Parkinson-like neurodegeneration in nontransgenic mice. Science 338, 949-953.

Marti M J, Tolosa E, Campdelacreu J. 2003. Clinical overview of the synucleinopathies. Mov. Disord. 6:S21-7.

Mata I F, Shi M, Agarwal P, Chung K A, Edwards K L, Factor S A, Galasko D R, Ginghina C, Griffith A, Higgins D S, Kay D M, Kim H, Leverenz J B, Quinn J F, Roberts J W, Samii A, Snapinn K W, Tsuang D W, Yearout D, Zhang J, Payami H, Zabetian C P. 2010. SNCA variant associated with Parkinson disease and plasma-synuclein level. Arch Neurol. November; 67(11):1350-6.

Nussbaum R L. 2017. Genetics of synucleinopathies. Cold Spring Harb Perspect Med. pii: a024109.

Oueslati A. 2016. Implication of alpha-synuclein phosphorylation at S129 in synucleinopathies: What have we learned in the last decade? J. Parkinsons Dis. 6, 39-51.

Petrucci S, Ginevrino M, Valente E M. 2016. Phenotypic spectrum of alpha-synuclein mutations: New insights from patients and cellular models. Parkinsonism Relat. Disord. 1:S16-20.

Rockenstein E, Nuber S, Overk C R, Ubhi K, Mante M, Patrick C, Adame A, Trejo-Morales M, Gerez J, Picotti P, Jensen P H, Campioni S, Riek R, Winkler J, Gage F H, Winner B, Masliah E. 2014. Accumulation of oligomer-prone α-synuclein exacerbates synaptic and neuronal degeneration in vivo. Brain 137, 1496-1513.

Ryu S W, Lee S J, Park M Y, Jun J I, Jung Y K, Kim E. 2003. Fas-associated factor 1, FAF1, is a member of Fas death-inducing signaling complex. J. Biol. Chem. 278, 24003-10.

Sampaio-Marques B and Ludovico P. 2015. Sirtuins and proteolytic systems: implications for pathogenesis of synucleinopathies. Biomolecules 5, 735-757.

Sato, H, Kato, T, and Arawaka, S. 2013. The role of Ser129 phosphorylation of a synuclein in neurodegeneration of Parkinson's disease: a review of in vivo models. Rev. Neurosci. 24, 115-123.

Snead D, Eliezer D. 2014. Alpha-synuclein function and dysfunction on cellular membranes. Exp. Neurobiol. 23, 292-313.

Spillantini M G, Schmidt M L, Lee V M Y, Trojanowski J Q, Jakes R, and Goedert M. 1997. Alpha-Synuclein in Lewy bodies. Nature, 388, 839-840.

Spillantini M G, Crowther R A, Jakes R, Hasegawa M, and Goedert M. 1998. Alpha-synuclein in filamentous inclusions of Parkinson's disease and dementia with Lewy bodies. Proc Natl Acad Sci USA, 95, 6469-6473.

Spillantini M G, Goedert M. 2000. The alpha-synucleinopathies: Parkinson's disease, dementia with Lewy bodies, and multiple system atrophy. Ann N Y Acad Sci. 920, 16-27.

Stefanova N, Bucke P, Duerr S, Wenning G K. 2009. Multiple system atrophy: an update. Lancet Neurol. 8, 1172-1178.

Sul J W, Park M Y, Shin J, Kim Y R, Yoo S E, Kong Y Y, Kwon K S, Lee Y H, Kim E. 2013. Accumulation of the parkin substrate, FAF1, plays a key role in the dopaminergic neurodegeneration. Hum. Mol. Genet. 2013 Apr. 15; 22(8):1558-73.

Sidransky E, Nails M A, Aasly J O, Aharon-Peretz J, Annesi G, Barbosa E R, Bar-Shira A, Berg D, Bras J, Brice A, Chen C M, Clark L N, Condroyer C, De Marco E V, Dirr A, Eblan M J, Fahn S, Farrer M J, Fung H C, Gan-Or Z, Gasser T, Gershoni-Baruch R, Giladi N, Griffith A, Gurevich T, Januario C, Kropp P, Lang A E, Lee-Chen G J, Lesage S, Marder K, Mata I F, Mirelman A, Mitsui J, Mizuta I, Nicoletti G, Oliveira C, Ottman R, Orr-Urtreger A, Pereira L V, Quattrone A, Rogaeva E, Rolfs A, Rosenbaum H, Rozenberg R, Samii A, Samaddar T, Schulte C, Sharma M, Singleton A, Spitz M, Tan E K, Tayebi N, Toda T, Troiano A R, Tsuji S, Wittstock M, Wolfsberg T G, Wu Y R, Zabetian C P, Zhao Y, Ziegler S G. 2009. Multicenter analysis of glucocerebrosidase mutations in Parkinson's disease. N. Engl. J. Med. 361, 1651-1661.

Trojanowski J Q, Revesz T. 2007. Proposed neuropathological criteria for the post mortem diagnosis of multiple system atrophy. Neuropathol. Appl. Neurobiol. 33, 615-620.

Walden H, and Muqit M M K. 2017. Ubiquitin and Parkinson's disease through the looking glass of genetics. Biochemical Journal 474, 1439-1451.

Soldner F, Stelzer Y, Shivalila C S, Abraham B J, Latourelle J C, Barrasa M I, Goldmann J, Myers R H, Young R A, Jaenisch R. 2016. Parkinson-associated risk variant in distal enhancer of α-synuclein modulates target gene expression. Nature 533, 95-9.

Wang T, Hay J C. 2015. Alpha-synuclein toxicity in the early secretory pathway: How it drives neurodegeneration in Parkinsons disease. Frontiers in Neuroscience Volume 9, Article 433.

Wang C, Chan P. 2014. Clinicogenetics of Parkinson's disease: a drawing but not completed picture. Neuroimmunol. Neuroinflammation 1, 115-126.

Yoo S E, Yu C, Jung S, Kim E, Kang N S. 2016. Design and synthesis of fluorescent and biotin tagged probes for the study of molecular actions of FAF1 inhibitor. Bioorg. Med. Chem. Lett. 26, 1169-72.

Yu C, Kim B S, Kim E. 2016. FAF1 mediates regulated necrosis through PARP1 activation upon oxidative stress leading to dopaminergic neurodegeneration. Cell Death Differ. 23, 1873-1885.

What is claimed is:

1. A method of treating a disease or condition arising from a synucleinopathy comprising administering to a subject presenting symptoms of synucleinopathy an effective amount of KM-819 (4-[2-(4-bromo-phenylsulfanyl)-acetylaminol-1-phenethyl-1H-pyrazole-3-carboxylic acid), thereby decreasing amount of alpha-synuclein in brain tissue cells of the subject.

2. The method of claim 1, wherein the disease or condition arising from a synucleinopathy is Parkinson's disease (PD).

3. The method of claim 1, wherein the disease or condition arising from a synucleinopathy is Dementia with Lewy bodies (DLB).

4. The method of claim 1, wherein the disease or condition arising from a synucleinopathy is Multiple Systemic Atrophy (MSA).

5. The method of claim 1, wherein the disease or condition arising from a synucleinopathy is associated with a mutation in one or more of an alpha-synuclein (SNCA) gene, a glucocerebrosidase (GBA) gene, a Parkin gene, a LRRK2 gene, a DJ-1 gene and a PINK1 gene; or an amount of alpha-synuclein that is phosphorylated at an amino acid S129 in cells of said subject that is higher than the amount of alpha-synuclein that is phosphorylated at amino acid S129 in cells of normal subjects.

\* \* \* \* \*